Patented Mar. 26, 1940

2,194,867

UNITED STATES PATENT OFFICE 2,194,867

RECOVERY OF GLOBULIN FROM COTTONSEED

Harold S. Olcott, Pittsburgh, Pa., assignor to Cotton Research Foundation, a corporation of Tennessee No Drawing. Application January 13, 1939, Serial No. 250,749

7 Claims. (Cl. 260—112)

This invention relates to the recovery of protein from cottonseed and consists in procedures whereby protein may be recovered from this source in maximum quantity and in optimum condition.

In an application for Letters Patent of the United States, filed September 21, 1938, by Ralph F. Nickerson, Serial No. 230,993, a method of procedure for the recovery of protein from cottonseed is described and claimed. That method involves the extraction of protein from properly prepared cottonseed meal by means of a dilute alkali solution. The protein that is thus recovered may be classified as a globulin. Globulins are insoluble in water, but they are soluble in dilute alkali or acid solutions, and in solutions of salts. I have discovered a procedure whereby the extraction of the protein from the meal may be effected by means of a salt solution; and I have found that in following my procedure I need not take certain precautions that must be taken in the alkali procedure alluded to in order to avoid discoloration. Discoloration due to pigments found in cottonseed is enhanced by the alkaline treatment; and, consequently, it is requisite to the successful practice of the alkaline treatment that the greater part of the hull particles be removed preliminarily from the meal, before it is subjected to the action of the alkali solution, and that in the course of procedure an antioxidant be used. I have found that my procedure, involving the use of a solution of neutral salt instead of a solution of alkali, may be carried out upon meal from which the hull particles have not been removed, and may be carried out without the use of an antioxidant, and yet a product may be obtained that is almost pure white in color. Furthermore, my procedure is inexpensive.

In the past few years the proteins as a special class of chemical compound have received considerable industrial development and, as a result, promise to be important commercial raw materials of the future. The more commonly used proteins (casein, albumins, and gelatin) are derived from animal sources; but, for the enjoyment of these, industry must compete unfavorably with a demand for them as food-stuffs. Proteins of vegetable origin are, consequently, of great interest; they offer the industrial consumer an almost unlimited supply and the probability of a more stable price.

Among the vegetable sources of protein, cottonseed occupies a unique position. There is an enormous annual production which is guaranteed by the demand for cotton lint. Cottonseed meats are extremely rich in protein. My invention concerns the recovery of industrially valuable protein from this rich and abundant source.

The crushing of cottonseed meats

The common practice in the preparation of cottonseed meats for the hydraulic pressing of oil consists of passing them between several pairs of closely set rolls and then giving them a high-temperature cooking treatment. This high-temperature processing destroys many of the desirable characteristics of the protein and causes a great deal of color fixation. There is further objection in that the subsequent pressing operation leaves in the meal a substantial residue of oil (5-7 per cent), and this residue is such as to interfere with protein extraction by inhibiting the penetration of aqueous solvents.

A practicable method of effecting a relatively complete separation of oil from cottonseed meats, without danger from heat effects, is by extraction with organic solvents. By this treatment the cottonseed oil content may readily be reduced to a negligible one percent, or less, and degradation produced by high temperature may be avoided. Several organic solvents are completely adequate to dissolve the oil (and the gossypol as well, the chief pigment present) of ground cottonseed meal.

Cracked kernels as obtained in an attrition mill are superior to rolled kernels in affording, after extraction, a white, fat-free meal. The grinding may easily be effected with seeds of low moisture content (5-6 percent). Low moisture is believed to be conducive to most rapid action by solvents. I have found that finely divided meal yields its oil and gossypol most readily, and, after the solvent extraction, is better suited to the isolation of protein material than coarse meal. The speed and efficiency with which a solvent acts are conditioned largely by the penetrating power of the solvent and the size of the meal particles. Generally, the smallest meal particles are best suited to extraction. Eighty-mesh is an excellent degree of fineness, from the standpoint of protein extraction, to which this pulverization may be carried, but in practice an average of sixty-mesh is a feasible and satisfactory limit. I have found it most satisfactory to grind the whole meats to twenty-mesh size to extract the oil with solvents, and after removal of the residual solvent, to regrind the dried meal to the requisite fineness.

Solvent extraction of raw cottonseed meal

There are a number of organic solvents that effect the simultaneous extraction of both the oil and the gossypol from the cottonseed meal. Among others, ethyl ether, for example, can be satisfactorily used on semi-plant scale. In industrial operation a non-inflammable solvent, or a solvent of lower inflammability than ethyl ether, may be preferred. The solvent-extracted meal, at the end of the extraction period, contains a residue of solvent. The removal of this residue is best conducted in an evaporator.

Leaching of cottonseed flour

When the cottonseed meats have been ground to a fine meal and rendered oil- and gossypol-free, they contain about 60 percent of protein on a dry basis. The residual 40 percent consists of sugars, gums, non-protein nitrogenous substances, interstitial cellulosic materials including pentosans, and probably other (as yet unidentified) substances. A fraction of the cottonseed protein is soluble in water; but by far the larger portion is insoluble in water. It is the latter fraction of the protein content of cottonseed meats whose extraction and recovery are the object of my invention.

If without further preparation the proteins be extracted from the meal and then precipitated, the precipitate forms a sticky, voluminous agglomerate that tends to adsorb and occlude the water-soluble proteins, and other extraneous substances. Such undesirable effect may to a large extent be minimized by leaching the cottonseed meal with water, and so removing the water-soluble materials, before proceeding to extract the proteins that are insoluble in water. The details of the procedure that I have taken with success are these: Beginning with fat-free cottonseed meal, 15 parts are thoroughly wet with 150 parts of water (preferably warm—35°–50° C.) and extracted for one to two hours, with occasional stirring. The wash-water is then removed, as by centrifugation, and discarded or retained for the isolation of by-products. Possible contaminants of the protein product are thus removed.

Digestion and extraction

The wet meal (residue of 15 parts original oil-free meal) is then dispersed in 70–80 parts of warm 3-percent salt (sodium chloride) solution. After standing for one to two hours, with occasional stirring, a first extract is removed by centrifugation. The residual meal is re-dispersed in a second body of 70–80 parts of warm 3-percent salt solution. After standing again for one to two hours the mixture is again centrifuged. The two extracts are now combined. If any fine meal remains in suspension it is removed, preferably by centrifugation.

The use of sodium chloride is recommended, because of its availability at low cost. However, sodium sulfate, sodium sulfite, disodium phosphate, and other salts of similar character are also effective as extracting agents, and may be used at the same degree of concentration. In this connection I use the term salt to include, not sodium chloride alone, but the other related salts also that have been named and alluded to above.

Precipitation of the protein

The clear extract in the salt solution is precipitated by adjusting the pH to 3.9–4.2, by the addition, with vigorous stirring, of acid—typically of 10-percent sulfuric acid. The protein separates as flocks and settles to the bottom of the vessel. The supernatant liquor is removed by any suitable means, and the protein slurry is then centrifuged to remove the residual water and salt.

The cake then is washed with water and is dried on trays in a drying tunnel. The yield is approximately 3 parts of dried cottonseed globulin. This amounts to 20 percent by weight of the original meal.

At no point in the procedure is the temperature raised higher than 50° C.

Physical properties of cottonseed proteins

The iso-electric point of a protein may be defined as the region of minimum properties. In aqueous solutions proteins act both as acids and as bases: they combine with alkali to form soluble salts, and they combine with strong acids to form soluble complexes. There is an intermediate point in the acid-base relationship at which proteins exhibit no tendency to combine and consequently precipitate. Thus, the iso-electric point corresponds to minimum solubility. For most proteins this neutral point or minimum point lies within the range of slight acidity, in the pH range 4 to 5. In fact, the iso-electric point of the water-soluble protein of cottonseed is approximately at pH 4.5. On the other hand, the principal protein fraction of cottonseed, the globulin, has a higher iso-electric point, which appears to lie between pH values 6.3 and 6.8. For all practical purposes this value corresponds to that of distilled water; and the significance is that, unlike most proteins, cottonseed globulin exhibits its minimum behavior in pure water. The importance of this difference from other proteins is immediately apparent in the fact that the globulin shows no tendency to swell or dissolve in water. This property indicates peculiar suitability of the protein under consideration for particular uses, such as in the production of waterproof glues and in the preparation of water-resistant textile and paper sizes and finishes. In the field of synthetic protein products, such as plastics, this property is of yet greater potential significance.

In carrying out the process as described above it will be observed that the water-soluble proteins present in the starting material (cottonseed meal) are in the main extracted and rejected. The protein material that is recovered is a salt-extracted protein or protein association that is of minimum solubility in distilled water. On this account the product is of high industrial value.

Summary

Dehulled cottonseed meats are cracked or flaked to $\frac{1}{20}$ inch fragments and thoroughly extracted with ethyl ether, or other suitable solvent.

The dried extracted meal is ground to $\frac{1}{60}$ inch fragments, is dispersed in 10 volumes of water, and leached for one to two hours at a temperature approximating though not exceeding 50° C. Centrifugation follows.

The firm cake of washed meal is re-dispersed in 5 volumes of 3-percent salt solution. Leaching continues for one to two hours with stirring. The liquor is removed by centrifugation and saved. The operation is repeated on the residue; and again the liquor is removed and added to that first removed.

To this liquor 10-percent sulfuric acid is added with vigorous stirring, until a pH of 3.9–4.2 is attained. The precipitate is separated, washed with water, and dried.

I claim as my invention:

1. The method herein described of recovering globulin from cottonseed meal which consists in extracting with an aqueous solution of salt a quantity of oil-free, water-leached cottonseed meal, separating the solution from the residue, acidifying the solution and thereby precipitating the globulin, and finally separating, washing, and drying the precipitate.

2. The method herein described of recovering globulin from cottonseed meal which consists in extracting with a solution of sodium chloride a quantity of oil-free, water-leached cottonseed meal, separating the solution from the residue, acidifying the solution and thereby precipitating the globulin, and finally separating, washing, and drying the pricipitate.

3. The method herein described of recovering globulin from cottonseed meal which consists in extracting with an aqueous solution of salt a quantity of oil-free, water-leached cottonseed meal, separating the solution from the residue, acidifying to a pH value of 3.9–4.2 and thereby precipitating the globulin, and finally separating, washing, and drying the precipitate.

4. The method herein described of recovering globulin from cottonseed meal which consists in extracting with a 3-percent aqueous solution of salt a quantity of oil-free, water-leached cottonseed meal, separating the solution from the residue, acidifying to a pH value of 3.9–4.2 and thereby precipitating the globulin, and finally separating, washing, and drying the precipitate.

5. The method herein described of recovering globulin from cottonseed meal which consists in extracting with a 3-percent aqueous solution of sodium chloride a quantity of oil-free, water-leached cottonseed meal, separating the solution from the residue, adding 10-percent sulfuric acid until a pH value of 3.9–4.2 is attained and thereby precipitating the globulin, and finally separating, washing, and drying the precipitate.

6. The method herein described of recovering globulin from cottonseed meal which consists in dispersing in an aqueous solution of salt a quantity of oil-free, water-leached cottonseed meal, with consequent solution of globulin, separating the solution from the residue, dispersing the residue in a second aqueous solution of salt, with further solution of globulin, separating the second solution from a second residue, acidifying the two so-separated solutions and thereby precipitating the globulin, and finally separating, washing, and drying the precipitate.

7. The method herein described of recovering globulin from cottonseed meal which consists in dispersing in a 3-percent aqueous solution of sodium chloride a quantity of oil-free, water-leached cottonseed meal with consequent solution of globulin, separating the solution from the residue, dispersing the residue in a second 3-percent aqueous solution of sodium chloride with further solution of globulin, separating the second solution from a second residue, combining the two so-separated solutions and acidifying the combined solutions to a pH value of 3.9–4.2 and thereby precipitating globulin, and finally separating, washing, and drying the precipitate.

HAROLD S. OLCOTT.